(12) United States Patent
Senft et al.

(10) Patent No.: US 11,402,924 B2
(45) Date of Patent: Aug. 2, 2022

(54) MAGNETIC ARRANGEMENT FOR DETECTING RELATIVE MOVEMENTS OR RELATIVE POSITIONS

(71) Applicant: Deutsches Zentrum für Luft- und Raumfahrt e.V., Cologne (DE)

(72) Inventors: Volker Senft, Seefeld (DE); Josef Reill, Kaufering (DE); Armin Wedler, Munich (DE); Nikolaus Seitz, Oberpfaffenhofen (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 30 days.

(21) Appl. No.: 16/500,914

(22) PCT Filed: Apr. 5, 2018

(86) PCT No.: PCT/EP2018/058787
§ 371 (c)(1),
(2) Date: Oct. 4, 2019

(87) PCT Pub. No.: WO2018/185248
PCT Pub. Date: Oct. 11, 2018

(65) Prior Publication Data
US 2020/0117283 A1    Apr. 16, 2020

(30) Foreign Application Priority Data

Apr. 7, 2017    (DE) .................... 10 2017 206 025.5

(51) Int. Cl.
*G06F 3/02*    (2006.01)
*G01B 7/00*    (2006.01)
*G01D 5/16*    (2006.01)

(52) U.S. Cl.
CPC .......... *G06F 3/0202* (2013.01); *G01B 7/003* (2013.01); *G01D 5/16* (2013.01)

(58) Field of Classification Search
None
See application file for complete search history.

(56) References Cited

U.S. PATENT DOCUMENTS

| 4,785,180 A | 11/1988 | Dietrich et al. |
| 4,866,854 A * | 9/1989 | Seltzer .................. B23P 19/105 33/561 |

(Continued)

FOREIGN PATENT DOCUMENTS

| CN | 101151538 A | 3/2008 |
| CN | 102227618 A | 10/2011 |

(Continued)

*Primary Examiner* — Jermele M Hollington
*Assistant Examiner* — Suresh K Rajaputra
(74) *Attorney, Agent, or Firm* — The Webb Law Firm

(57) ABSTRACT

The present disclosure relates to a magnetic arrangement for detecting the relative movement and/or relative position of a first and a second object to each other in six components, namely three displacements and three angular rotations in and about three axes of the Cartesian coordinate system respectively with at least six sensor units to detect the three displacements and the three angular rotations, wherein each sensor unit has at least one magnet and a magnetoresistive sensor, wherein the at least one magnet of the sensor unit can be moved relative to the magnetoresistive sensor of the sensor unit, and wherein each sensor unit has a sensor direction, wherein the magnetoresistive sensor measures a position of the at least one magnet along the sensor direction. The present disclosure also relates to an input device and a mobile input device that has a magnetic arrangement of this kind.

22 Claims, 4 Drawing Sheets

(56) References Cited

U.S. PATENT DOCUMENTS

| | | |
|---|---|---|
| 7,958,782 B2 | 6/2011 | Phan Le |
| 8,201,460 B2 | 6/2012 | Bitto et al. |
| 8,510,962 B2 | 8/2013 | Lee |
| 9,423,894 B2 | 8/2016 | Olsson et al. |
| 9,690,390 B2 | 6/2017 | Olsson et al. |
| 10,179,575 B2 | 1/2019 | Shin et al. |
| 10,296,095 B2 | 5/2019 | Olsson |
| 2012/0215475 A1 | 8/2012 | Rutledge et al. |
| 2012/0306603 A1* | 12/2012 | Olsson .................. G06F 3/0362 335/229 |
| 2014/0340372 A1* | 11/2014 | Olsson .................... G06F 3/016 345/184 |
| 2016/0137225 A1 | 5/2016 | Tarum et al. |
| 2016/0378191 A1 | 12/2016 | Olsson |

FOREIGN PATENT DOCUMENTS

| | | |
|---|---|---|
| CN | 102735162 A | 10/2012 |
| CN | 105882748 A | 8/2016 |
| CN | 105984451 A | 10/2016 |
| DE | 3611337 A1 | 10/1987 |
| DE | 102010062458 A1 | 6/2012 |
| JP | 2013164316 A | 8/2013 |

\* cited by examiner

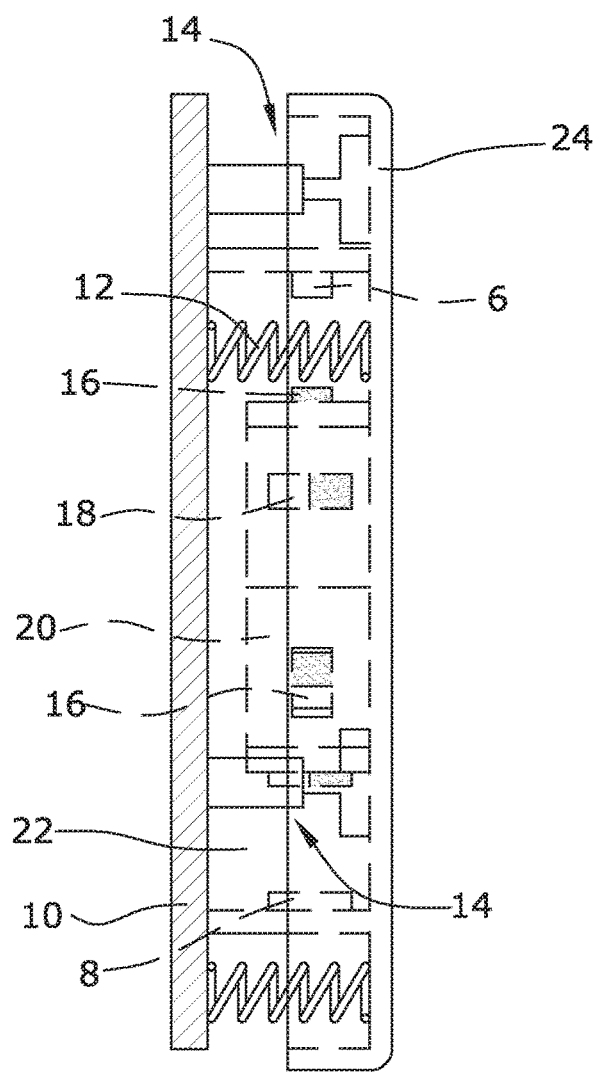
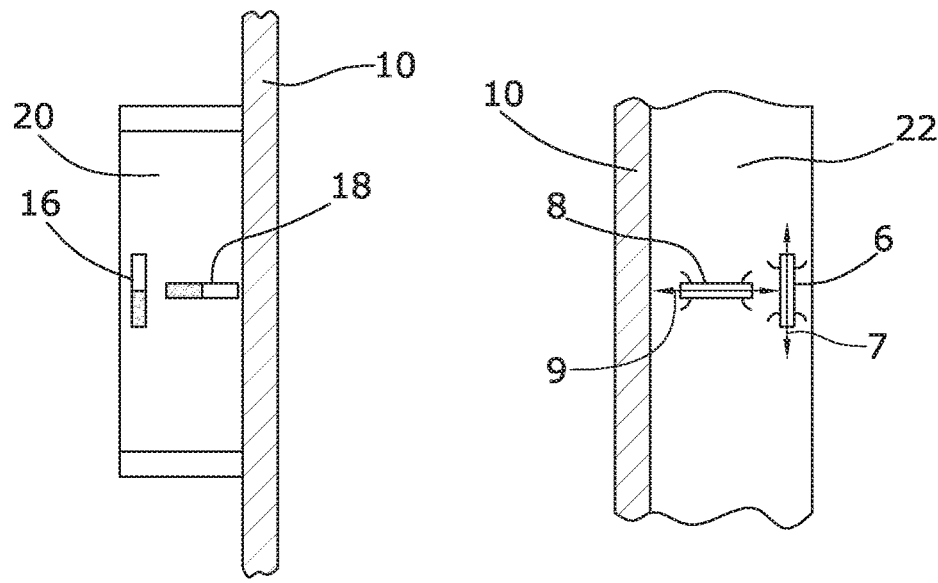
Fig. 3
Fig. 4
Fig. 5

MAGNETIC ARRANGEMENT FOR DETECTING RELATIVE MOVEMENTS OR RELATIVE POSITIONS

CROSS-REFERENCE TO RELATED APPLICATIONS

This application is the United States national phase of International Application No. PCT/EP2018/058787 filed Apr. 5, 2018, and claims priority to German Patent Application No. 10 2017 206 025.5 filed Apr. 7, 2017, the disclosures of which are hereby incorporated by reference in their entirety.

BACKGROUND OF THE INVENTION

Field of the Invention

The invention relates to a magnetic arrangement for detecting relative movements or relative positions of two objects, items, bodies or the like. Further, the invention relates to an input device comprising the magnetic arrangement according to non-limiting embodiments described below.

Description of Related Art

Relative movements describe displacements or angular rotations of the two objects relative to each other. Relative positions are the resultant positions of the objects relative to each other. For detecting these relative movements and/or relative positions of two objects, optoelectronic arrangements have become prevalent. In some cases, the movement of a movable object relative to a stationary object may be detected. Displacements in the components X, Y and Z, for example, are described. These components may correspond to a displacement in a Cartesian XYZ coordinate system. Angular rotations of the two objects relative to each other may be described by the components A, B and C each of which expresses rotations about the axes X, Y and Z. Thus six different relative movements may be produced between two objects which are freely movable relative to each other, e.g., have six degrees of freedom. These are three different displacements (X, Y and Z displacement) and three different angular rotations (A, B and C angular rotation). With the aid of these six movements any relative movement and/or relative position between two objects with six degrees of freedom can be expressed. This can be done via a transformation $R_x(A)$, $R_y(B)$, $R_z(C)$ and $T_{xyz}(X, Y, Z)$.

$$R_x(A) = \begin{pmatrix} 1 & 0 & 0 & 0 \\ 0 & \cos A & -\sin A & 0 \\ 0 & \sin A & \cos A & 0 \\ 0 & 0 & 0 & 1 \end{pmatrix}$$

$$R_y(B) = \begin{pmatrix} \cos B & 0 & \sin B & 0 \\ 0 & 1 & 0 & 0 \\ -\sin B & 0 & \cos B & 0 \\ 0 & 0 & 0 & 1 \end{pmatrix}$$

$$R_z(C) = \begin{pmatrix} \cos C & -\sin C & 0 & 0 \\ \sin C & \cos C & 0 & 0 \\ 0 & 0 & 1 & 0 \\ 0 & 0 & 0 & 1 \end{pmatrix}$$

$$T_{xyz}(X, Y, Z) = \begin{pmatrix} 1 & 0 & 0 & X \\ 0 & 1 & 0 & Y \\ 0 & 0 & 1 & Z \\ 0 & 0 & 0 & 1 \end{pmatrix}$$

$$TR_{xyz}(X, Y, Z, A, B, C) = T_{xyz}(X, Y, Z) \cdot R_x(A) \cdot R_y(B) \cdot R_z(C)$$

DE 36 11 337 A1 describes an optoelectronic arrangement which is accommodated in a plastic sphere and simultaneously detects six components, notably displacements (X, Y, Z) along three axes and angular rotations (A, B, C) about three axes of two objects which are movable relative to each other. For this purpose, six LEDs are arranged on a first stationary object. The light of these LEDs impinges on slit apertures which are arranged at a second movable object. The light passing through the slits is detected with the aid of position-sensitive light detectors comprised by the first object, and thus the position and/or movement of the two objects which are movable relative to each other is obtained. The relative movement or relative positions of the two objects are outputted as X, Y, Z, A, B, C components with the aid of an electronic control system and a computation unit (microprocessor).

Due to geometric dependencies of the beam path of this optical sensor system the sensor described above must have a minimum size. A miniaturization is thus only possible to a limited extent since the optical elements used must keep a certain distance to allow for a correct optical imaging. Further, at least six sensor units comprising LED, slit aperture and detector are required for the detection of all six displacement and rotation coordinates (X, Y, Z and A, B, C). This results in a minimum number of required components. As a result, limits are set to an extensive miniaturization of optoelectronic arrangements for detecting relative movements and relative positions.

Further, optoelectronic components are by their very nature sensitive to contamination. There must not be any foreign particles, such as dirt or dust, for example, in the beam path, which will falsify the optical imaging. Therefore, a preferably closed, clean environment is required.

Arrangements for detecting relative movements and/or relative positions in particular may be used in industrial applications. On the one hand, these arrangements can be used for e.g., detecting forces, moments, movements and/or positions of two objects, for example in test benches and measuring systems for vehicles and the like. On the other hand, these arrangements are used for controlling robots or in virtual designs, in particular 3D design software. Thus input devices comprising such an arrangement, for example 3D mice, can be used for moving objects in a virtual 3D environment or for enabling the user to maneuver through a 3D landscape. Preferably, these input devices are used for producing 3D designs with the aid of CAD programs. In addition, arrangements for detecting relative movements and/or relative positions can be used in joysticks, game consoles, datagloves, computer keyboards, computer mice, trackpads or touchpads. Here, a miniaturization is preferred to enable a place-saving integration into the electronic devices.

SUMMARY OF THE INVENTION

It is an object of the invention to provide a magnetic arrangement for detecting relative movements and/or relative positions which has a small size and a simpler structure.

Furthermore, it is an object of the invention to provide an input device having such a magnetic arrangement and also having a small size and a simpler structure.

The objects are achieved with a magnetic arrangement according to claim 1, an input device according to claim 18 and a mobile input device according to claim 19.

The magnetic arrangement according to the invention for detecting relative movements and/or relative positions of a first and a second object relative to each other in six components, notably three displacements and three angular rotations in and respectively about the three axes of the Cartesian coordinate system comprises at least six sensor units for detecting the three displacements and the three angular rotations. Each sensor unit comprises at least one magnet and one magnetoresistive sensor, wherein the at least one magnet of the sensor unit is movable relative to the magnetoresistive sensor of the sensor unit. Each sensor unit has a sensor direction along which the magnetoresistive sensor measures a position of the at least one magnet. It is preferred that the magnetic arrangement comprises exactly six sensor units for detecting the three displacements and three angular rotations, wherein each sensor unit in particular comprises exactly one magnet and one magnetoresistive sensor associated with this magnet.

In particular, the sensor direction describes a direction along which the sensor can detect, preferably measure, changes, in particular movements, of the magnet. Here, it is particularly preferred that, when the magnet moves, merely that portion of the movement that is essentially parallel to the sensor direction is measured. Here, it is not necessary that the magnet moves in parallel to the sensor direction. If, for example, the sensor direction is horizontal and the magnet moves transversely, the sensor only measures that portion of the movement of the magnet that is parallel to the sensor direction. In a particularly preferred embodiment, the sensor can detect and distinguish between positive and negative position changes. During a rotation, that is one or more angular rotations of the objects relative to each other, the magnet describes a circular movement due to the distance to the center of rotation. The translational portion of the circular movement is detected by the sensor, while the purely rotational portion is nearly or completely ignored by the sensor.

Preferably, the relative movement, which is in particular performed between two bodies and which is detected by the magnetic arrangement, describes displacements X, Y or Z along the axes of the Cartesian coordinate system (X, Y, Z axis) and/or angular rotations A, B, C about the axes of the Cartesian coordinate system. In particular, the relative position is a position attained by displacements and/or angular rotations. Furthermore, the displacements and angular rotations describe the six degrees of freedom of the two objects.

It is also conceivable that more than six sensor units are used and a plurality of sensor units detect the relative movements and/or relative positions overdetermined. Thus a higher measuring accuracy, a validation of the measurement and a fail-safe can be attained.

It is preferred that the magnetoresistive sensors are one-dimensional sensors. One-dimensional sensors have a one-dimensional, also referred to as linear, sensor direction along which movement changes are detected. Such sensors distinguish themselves, inter alia, by being small, inexpensive and to a large extent resistant or insensitive to errors.

Preferably, at least three sensor units having essentially parallel sensor directions are each arranged as a first and a second group. The sensor directions of the sensor units of the first group are essentially perpendicular to the sensor directions of the sensor units of the second group. Thus the sensor units of the first group detect displacements along the X and the Y axis as well the angular rotation C about the Z axis. The sensor units of the second group detect the displacement along the Z axis as well as the angular rotations A and B about the X and the Y axis, respectively. Preferably, the sensor units of the first group are arranged horizontally and the sensor units of the second group are arranged perpendicularly. In other words, the positional relationship of the sensor units of the first and the second group can be realized such that the sensor units of the first group are arranged horizontally relative to the sensor units of the second group, wherein the sensors of the second group are arranged vertically and thus perpendicularly relative to the sensors of the second group. According to this definition, it is preferred to a large extent that the first group of the sensor units comprises at least three horizontal magnets and at least three horizontal magnetoresistive sensors associated with these horizontal magnets. Accordingly, the second group of the sensor units preferably comprises at least three vertical magnets and at least three magnetoresistive sensors associated with these magnets and having a vertical sensor direction. The positional relationship regarding the magnets refers to the connecting line between the north and the south pole of a respective magnet. If, for example, a horizontal and a vertical magnet are present, the connecting line between the north and the south pole of the one magnet extends perpendicularly to the connecting line between the north and the south pole of the other magnet.

It is preferred that the particularly vertical magnets of the second group of the sensor units point with the same pole into the same direction. The preferably horizontal magnets of the first group of the sensor units are arranged alternatingly to each other in particular with regard to the poles. Such an arrangement results in similar magnetic field relationships.

Preferably, the sensor units of the first and/or the second group are arranged on a circle circumference, in particular at an angular distance of 120° each. It is preferred that in the case of a total of six sensor units, these sensor units are arranged on a circle circumference at a distance of 60° to each other.

When more than six sensor units are used, it is preferred to arrange the sensor units in the first and/or the second group on a circle circumference at the same angular distance to each other.

Preferably, the two planes on which the two circle circumferences are located are parallel, and in particular truly parallel, to each other. The two planes can thus be disposed one inside the other or arranged in parallel at a distance, that is truly parallel, to each other. If, for example, the relative movement of a perpendicularly arranged circular cylinder, located in a hollow cylinder, relative to this hollow cylinder is to be detected, three sensor units in a first group for detecting the three degrees of freedom, displacements X and Y as well as angular rotation C can be arranged in a plane which is in particular parallel to the base area of the cylinder. Furthermore, the three sensor units are arranged on a circle circumference, in particular at an angular distance of 120° each. Also, three other sensor units in a second group are used for detecting the three degrees of freedom, angular rotations A and B as well as displacement Z and are also arranged in a plane, which is in particular parallel to the base area of the cylinder, on a circle circumference, in particular at an angular distance of 120° each. In this embodiment, the two planes, where the two circle circumferences are located, are parallel to each other, but the two planes can also be freely arranged in the space. It is thus not absolutely necessary that the two planes are parallel to the base area of a cylinder. The six sensor units are essentially arranged in the space in such a manner that each displacement or angular rotation is detected by at least two sensors. The spatial arrangement of the sensors enables the calculation of a calibration matrix by means of which the inverse matrix (same number of sensors as degrees of freedom) and respectively the pseudoinverse (more sensors than degrees of freedom) can be calculated by a suitable mathematical conversion. The calibration matrix establishes the connection between the detected measured values of the sensors and the desired relative movement and the relative position, respectively. Thus in the three-dimensional space a total of six movements (X, Y, Z and A, B, C) exist.

Preferably, the magnetoresistive sensors of the AMR type (anisotropic magnetoresistive effect), GMR type (huge magnetoresistive effect), CMR type (colossal magnetoresistive effect) or TMR type (tunnel magnetoresistive effect) are used.

A magnetoresistive sensor detects the field lines emanating from a magnet. Here, the direction of the field lines and not the field strength is measured. If the magnet and the magnetoresistive sensor move relative to each other—along the measurement-sensitive sensor direction—the sensor can measure the position relative to the magnet. In the case of movements perpendicular to this direction no or almost no change of the measured position is achieved.

If four magnetoresistive part-sensors are interconnected in a chip to form a Wheatstone bridge, two voltages are obtained which are dependent on the existing magnetic field. The magnetic field is generated by a magnet, and the resultant voltages represent the sine or respectively the cosine signal of the position sensor.

By applying the arc tangent $\alpha$=arctan 2(cosine signal, sine signal) the two sensor voltages can be combined to form the angle $\alpha$. Its value range ranges from $-\pi$ to $+\pi$. Values beyond this range do not result in unique measured values since the function arctan 2( ) is a periodic function—with the period $2\pi$. By a simple scaling the measured value of angle $\alpha$ from $-\pi$ to $+\pi$ is converted into a distance—for example mm. In the case of a total of six individual sensor units thus six measured values $\alpha_1$, $\alpha_2$, $\alpha_3$, $\alpha_4$, $\alpha_5$, $\alpha_6$ exist.

A suitable calibration matrix can convert the six obtained distances into the coordinates of the displacement (X, Y, Z) and angular rotation (A, B, C).

The movement of the magnet along the movement direction, to which the magnetoresitive position sensor is sensitive, that is the sensor direction, results in a quasi-linear change of the measured position. From the geometric arrangement of the six individual sensor units of the arrangement the associated calibration matrix M can be calculated.

$$\begin{pmatrix} X \\ Y \\ Z \\ A \\ B \\ C \end{pmatrix} = M \begin{pmatrix} \alpha_1 \\ \alpha_2 \\ \alpha_3 \\ \alpha_4 \\ \alpha_5 \\ \alpha_6 \end{pmatrix}$$

A second possibility for determining the calibration matrix is by gaging. Here, known deflections of the arrangements are carried out, and the associated measured values of all sensor units are acquired. This also enables a calibration matrix to be calculated.

Preferably, at least one magnet, and in particular all magnets, are permanent magnets.

Preferably, the magnets are arranged on a second object. This object is in particular a movable object. The sensors are preferably arranged on another first object which is in particular an immovable object. The movability of the objects relative to each other refers in particular to movements of the objects relative to each other. Thus it is preferred that the second object is movable relative to the first object. Preferably, the first object is fixedly connected to the environment, for example connected to a table or arranged thereon, such that the first object is immovable relative to the environment, but the second object can move relative to the first object. It is also possible that the first object is configured such that it can be fixed, e.g. held, relative to the environment by a user and thus no movement of the first object relative to the environment takes place, but the second object remains movable relative to the first one.

Preferably, the sensors are arranged on circuit boards. Here, it is preferred to in particular horizontally arrange the at least three sensors of the first group on a common circuit board. Furthermore, it is preferred to in particular perpendicularly arrange the at least three further sensors of the second group on a circuit board. Preferably, all sensors are arranged on a common circuit board.

In another embodiment, the circuit boards are connected to an evaluation device and/or control unit and/or electrical power source. With the aid of the electrical power source the sensors can be supplied with electrical power. The evaluation device and respectively the control unit ensure that the detected measured variables of the sensors are transformed in particular into electric signals and are preferably outputted in measurement units for representing the relative movement and/or relative position.

Preferably the magnets are rigidly connected to each other. Here, the magnets can be directly placed, e.g. impressed, into one of the objects, in particular the movable second object such that the magnets can no longer be perceived as magnets but form part of the object.

Preferably, the two objects are flexibly connected to each other. This flexible connection can in particular be realized via at least one, preferably via three spring elements. Also, more than three spring elements are conceivable.

Preferably, the two objects are adapted to be moved relative to each other along all six degrees of freedom. However, it is also conceivable that between the two objects bearings or the like are inserted and thus the relative movement of the two objects has fewer degrees of freedom.

Preferably, one object comprises at least six sensors, and the other object comprise at least six magnets. Here, the sensor of the one object is associated in parallel with at least one magnet of the other object such that a sensor unit is realized.

Preferably, the first object only comprises sensors and the second object only comprises magnets. Here, it is particularly preferred that all sensors of the first object are connected to a circuit board which preferably forms part of the first object or corresponds to the first object.

Another embodiment, which is particularly preferred, distinguishes itself in that the second object is arranged in an immovable or stationary manner and the first object is a movable object. As a result, it is irrelevant whether the first or the second object is movable. It is also conceivable that both objects are movable.

Preferably, the magnetic arrangement comprises a mechanical stop which prevents each magnet from leaving the respective measuring range of its associated sensor. This mechanical stop, also referred to as stopper, is in particular at least one damping device and/or at least one stopping device. Besides this intended use of the mechanical stop, the stopping and/or damping devices can also be used for causing desired movement restrictions between the two objects, if necessary. Furthermore, the damping device can be used for preventing vibrations which may occur when the arrangement springs back from a deflected position into the rest position.

Preferably, the second object is movably connected to the first object via spring elements and/or damping elements. Thereby, after a deflection, the movable object can return into its initial position. Here, the measured values of the initial position determine the starting point of the magnetic arrangement. A relative displacement and/or angular rotation causes the spring and/or damping elements used to be extended and compressed, respectively. By means of the spring law f=c·s—with the force F in [N], the distance s in [mm] and the spring constant c in $$\left[\frac{N}{mm}\right]$$

—the occurring forces can be obtained. Due to the geometric arrangement of the spring and/or damping elements, in particular the distance to the center of rotation, torsional moments may also occur. The magnetic arrangement presented here can thus also detect forces and/or moments. Using a suitable calibration matrix, the magnetic arrangement can determine and output forces and torsional moments.

By means of Newton's law, which establishes the relationship between force, mass and acceleration (F=m·α, F in [N], m in [kg] and a in $$\left[\frac{m}{s^2}\right]),$$

and the equivalent law regarding the relationship between torsional moment, mass moment of inertia and angular acceleration (M=J·α, M in [Nm], J in [kgm$^2$] and α in $$\left[\frac{1}{s^2}\right]),$$

the magnetic arrangement can also measure accelerations and respectively angular accelerations using a suitable calibration matrix.

It is preferred that the first object and/or the second object are essentially cylindrical. Here, a cylinder shape does not only describe a circular cylindrical shape but also comprises prismatic or conical shapes.

In particular, the first object is essentially hollow cylindrical. Additionally or alternatively, the second object is preferably configured essentially as a solid cylinder.

In a preferred embodiment, the magnets, are in particular exclusively arranged on the outside of the second object. If the second object is configured as a solid cylinder, the magnets are preferably arranged on the outside of the lateral surface of the cylinder. Furthermore, it is preferred that the magnetoresistive sensors are in particular exclusively arranged on the inside of the first object. If the first object is hollow cylindrical, the magnetoresistive sensors are preferably arranged on the inside of the lateral surface of the hollow cylinder.

It is preferred that the second object is in particular completely arranged inside the first object. In the case of such an arrangement definition, it is not absolutely necessary that the first object completely encases or completely surrounds the second object. Rather, such an arrangement definition means that the second object is in particular completely arranged inside the external dimensions, also referred to as contour, of the first object. If the first object is configured as a hollow cylinder and the second object is configured as a solid cylinder, it is preferred that the solid cylinder is arranged inside the hollow cylinder.

Furthermore, it is preferred that the second object comprises two essentially opposite sides. According to the configuration of the second object, these two sides are preferably opposite each other in a longitudinal arrangement. If the second object is a cylindrical object, for example, these two sides preferably correspond to the base areas of the cylinder. Here, these two sides as well as the magnetic arrangement itself are configured such that a user can move the one side and/or the other side. Such a movement means the deflection of the second object via an action upon one or both sides. Thus, via an action on the part of the user, for example via a deflection by means of a finger, a movement of the second object relative to the first object is performed. Here, for example, the magnetic arrangement can be configured such that a user touches one of the sides with his finger and thus causes a deflection of the second object. On the other hand, it is also possible that the magnetic arrangement is realized such that two fingers, for example the thumb and the index finger, of a user come into contact with both sides and can thus perform a deflection of the second object relative to the first object along the three displacements and along the three angular rotations.

The input device, in particular a 3D input device, comprises a magnetic arrangement according to the invention and, furthermore, distinguishes itself in that the second object, which is in particular movable, is a cap that is a hollow cylinder closed on one side and has a spherical shape, for example. It is particularly preferred that all components of the magnetic arrangement are at least partially arranged inside this cap.

Preferably, all components of the magnetic arrangements, except for the first, in particular stationary object, are arranged inside the cap. Thereby the components can be protected from external influences, such as dirt, water, disturbing magnetic fields etc., for example. Here, the stationary object forms a kind of basis on which the cap is arranged in which all further components of the magnetic arrangement are located.

Preferably, this cap can be in particular partially grasped by the hand of the user. Thus a user can transfer three-dimensional movements to the magnetic arrangement via the cap, which are then passed on as inputs to a computer. It is also possible that the second object is configured such that a user, with one or more fingers, can cause a movement of the second object relative to the first object.

Instead of the cap shape of the second object, nearly any conceivable shape of the second object is possible. Thus the second object can also be an in particular round or rectangular plate, a portion of a spherical shell, a cylinder, a cuboid or the like. Here, it is preferred that the second object has the shape of a portion of the input device held in the user's hand; for example the shape of a 3D mouse surface, the shape of a joystick etc.

In another embodiment, it is also possible that the first object has any of the aforementioned shapes.

The mobile input device according to the invention comprises a mobile device, such as a mobile phone or a tablet computer or a laptop or a navigation device or the like, for example, as well as a magnetic arrangement according to the invention as per the definition given above. Here, the mobile device is connected to the first object of the magnetic arrangement to rotate therewith. Here, to rotate therewith relates to a connection where a movement or deflection of the first object causes the mobile device to be deflected, too, and vice versa. It is preferred that this type of connection is configured as an integral connection. Such a connection is also referred to as integrated.

In a preferred embodiment, the processor of the mobile device corresponds to an evaluation device and/or a control unit of the magnetic arrangement. As a result, the processor existing in every mobile device is used for evaluation and/or control of the magnetic arrangement. For this purpose, it is preferred that the magnetoresistive sensors of the magnetic arrangement are connected to the processor via cable, conductor paths and the like, for example, in such a manner that data are transferred.

In particular, the power source of the mobile device, for example the rechargeable battery of the mobile device, corresponds to the power source of the magnetic arrangement. Consequently, the power source of the mobile device can be used for supplying the magnetic arrangement with power, and no additional power source is required. Here, it is preferred that the magnetoresistive sensors of the magnetic arrangement are connected to the power source of the mobile device via cable, for example, in such a manner that power is transferred.

In the preferred embodiment described above, in particular only the magnetoresistive sensors are connected to the power source and/or the processor of the mobile device. Since magnets, in particular configured as permanent magnets, do not require any power source or evaluation device, such an arrangement is advantageous. Thus it is also preferred that all magnetoresistive sensors are connected to the first object and thus in particular to the mobile device, and all magnets are connected to the second object.

In a preferred embodiment, the magnetic arrangement is in particular completely arranged inside the mobile device. Such an arrangement definition relates again to an arrangement of the magnetic arrangement inside the contour of the mobile device. Here, it is preferred that such an arrangement where the first object, which is in particular configured as a hollow cylinder, is embedded in the magnetic arrangement inside the mobile device, and the second object, in particular configured as a solid cylinder, is located inside the first object, for example.

It is preferred that the second object of the magnetic arrangement is adapted to be moved by a user from the lower side and/or the upper side of the mobile device, preferably by grasping. For example, according to the description above, where the first object is embedded in the mobile device, here the first object and the second object are arranged such that a user can touch two sides of the second object, e.g. with the thumb and the index finger, and thus perform a movement of the second object relative to the first object along the six components. Thus a user in particular grasps the second object from the upper or the lower side of the mobile device. If the mobile device is a mobile phone, for example, the upper side corresponds to the display side and the lower side corresponds to the opposite side.

BRIEF DESCRIPTION OF THE DRAWINGS

In the drawings:

FIG. 3 shows a schematic side view of the input device according to the invention of FIG. 1 having the magnetic arrangement for detecting relative movements and/or a relative position, FIG. 4 shows a side elevational view of the input device according to the invention as per the view of FIG. 2 showing the arrangement of the magnets of this embodiment, FIG. 5 shows a side elevational view of the input device according to the invention as per the view of FIG. 2 showing the arrangement of the sensors of this embodiment.

DESCRIPTION OF THE INVENTION

Figure 1:
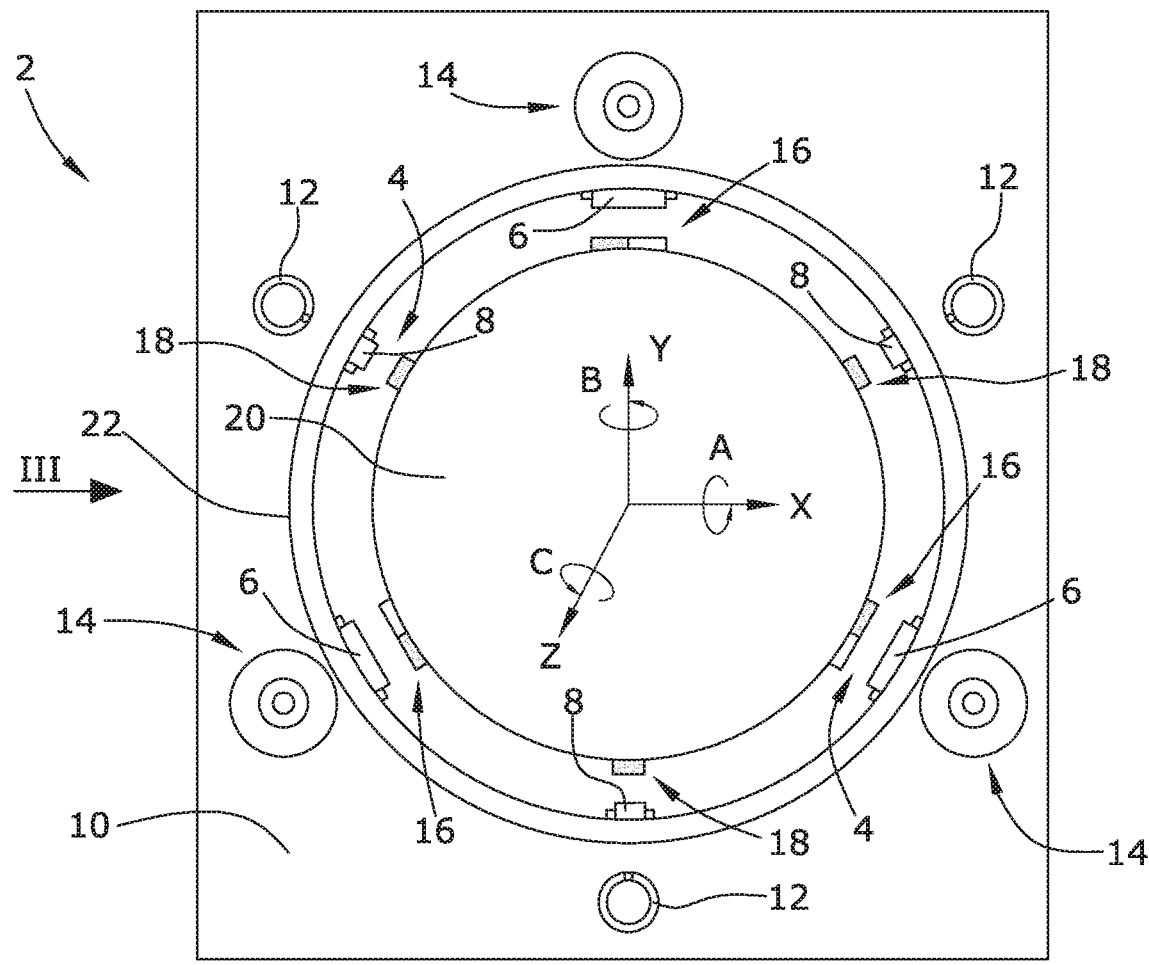
FIG. 1 shows a schematic top view of the input device according to the invention having the magnetic arrangement according to the invention for detecting relative movements and/or a relative position.

The magnetic arrangement according to the invention for detecting relative movements and/or relative positions 2 as shown in FIG. 1 comprises six sensor units 4 (only two sensor units 4 are exemplarily given a reference numeral), wherein each sensor unit comprises a magnet 16, 18 and a sensor 6, 8. The magnets 16, 18 are arranged on the lateral surface of a cylinder 20. Here, the illustrated embodiment comprises three horizontal magnets 16 and three perpendicularly arranged magnets 18. The three horizontal magnets 16 are arranged on a circle circumference extending along the lateral surface of the cylinder, each having an angular distance of 120° to each other. The three perpendicularly arranged magnets 18, too, are arranged on a circle circumference and are also arranged at an angular distance of 120° to each other. In this embodiment, all magnets 16, 18 are disposed on a common circle circumference and are alternatingly arranged at an angular distance of 60° to each other. In the illustrated exemplary embodiment, the cylinder 20 is located inside the hollow cylinder 22. The cylinder 20 comprising the magnets 16, 18 is here arranged such that it is freely movable relative to the hollow cylinder 22. Opposite the respective horizontal magnets 16 a horizontal sensor 6 is located at the inner surface of the hollow cylinder 22. Opposite the respective perpendicularly arranged magnets 18 a perpendicularly arranged sensor 8 is located at the inner surface of the hollow cylinder 22. The sensors 6, 8 are magnetoresistive sensors. These magnetoresistive sensors 6, 8 are arranged such that they are parallelly opposite the respective magnet and have a sensor direction 7, 9 as illustrated in FIG. 5 which also extends in parallel to the magnets, in particular to their magnetization direction. Here, in particular the sensor direction 7 extends in parallel to the tangent located directly oppositely on the cylinder 20.

Here, the magnets 16 and 18 are of a bar-type configuration and have a circular, square, rectangular or any other basic shape. At one end is the north pole and at the other end is the south pole of the magnet. For a symmetrical overall magnetic field, the magnets are preferably equally arranged with respect to the north and the south pole. If the influence between the various magnets 16 and 18 is negligible, the magnets can be arranged in any orientation.

Sensor 6 and oppositely arranged magnet 16 as well as sensor 8 and oppositely arranged magnet 18 respectively form a sensor unit 4. In the illustrated exemplary embodiment, the sensor direction 7, 9 extends in parallel to the longitudinal center line of the sensors 6, 8 which are illustrated here a being rectangular. The sensors 6, 8 detect movements of the respectively associated magnet 16, 18 along the sensor direction 7, 9.

If the cylinder 20, which here represents the second object 20, describes displacements or a translation in the XY plane, for example, in the illustrated exemplary embodiment, at least two of the sensors 6 detect a positive or a negative movement along the sensor direction 7. If the displacement is performed exactly perpendicularly to the sensor direction 7 of one of the sensors 6, this sensor detects no or nearly no movement. Otherwise, all three sensors 6 can detect a positive or a negative movement. If a second displacement different to the first displacement of the cylinder 20 in the XY plane is performed, this is also detected as a positive or a negative movement by the sensors 6. With the aid of the sensors 6 thus any displacement in the XY plane can be detected.

If an angular rotation of the cylinder 20 about the Z axis, that is a rotation in the XY plane, also referred to as jaw, is performed, this is also detected by the sensors 6. Here, all the sensors 6 sense a positive or a negative movement of the cylinder 20 depending on the direction of rotation. Due to the simultaneously sensed positive or negative movement, the corresponding rotation or jaw can be detected.

If a displacement of the cylinder 20 along the Z axis is performed, this is detected by all perpendicularly arranged sensors as a positive or a negative movement along the sensor direction 9 of the perpendicularly arranged sensors 8.

If an angular rotation about the X axis, also referred to as roll, and or an angular rotation about the Y axis, also referred to as pitch, is performed, this is also detected by the three perpendicularly arranged sensors 8. Depending on the rotational movement, the perpendicularly arranged sensors 8 detect a positive or a negative movement along the sensor direction 9. Using a combination of these positive and/or negative movements it can be determined whether roll and/or pitch is concerned.

The direction vector 7 or 9 is in fact a unit vector with a starting and an end point. That is, a vector pointing into one direction and not in both directions of the sensor, as exemplarily illustrated in FIG. 5. If the movement of the sensor takes place in the direction of the vector, the detected value is positive, otherwise it is negative.

By a combination of the measurements of the six sensors 6, 8, all movements along the six degrees of freedom of the cylinder 20 can be detected.

Figure 2:
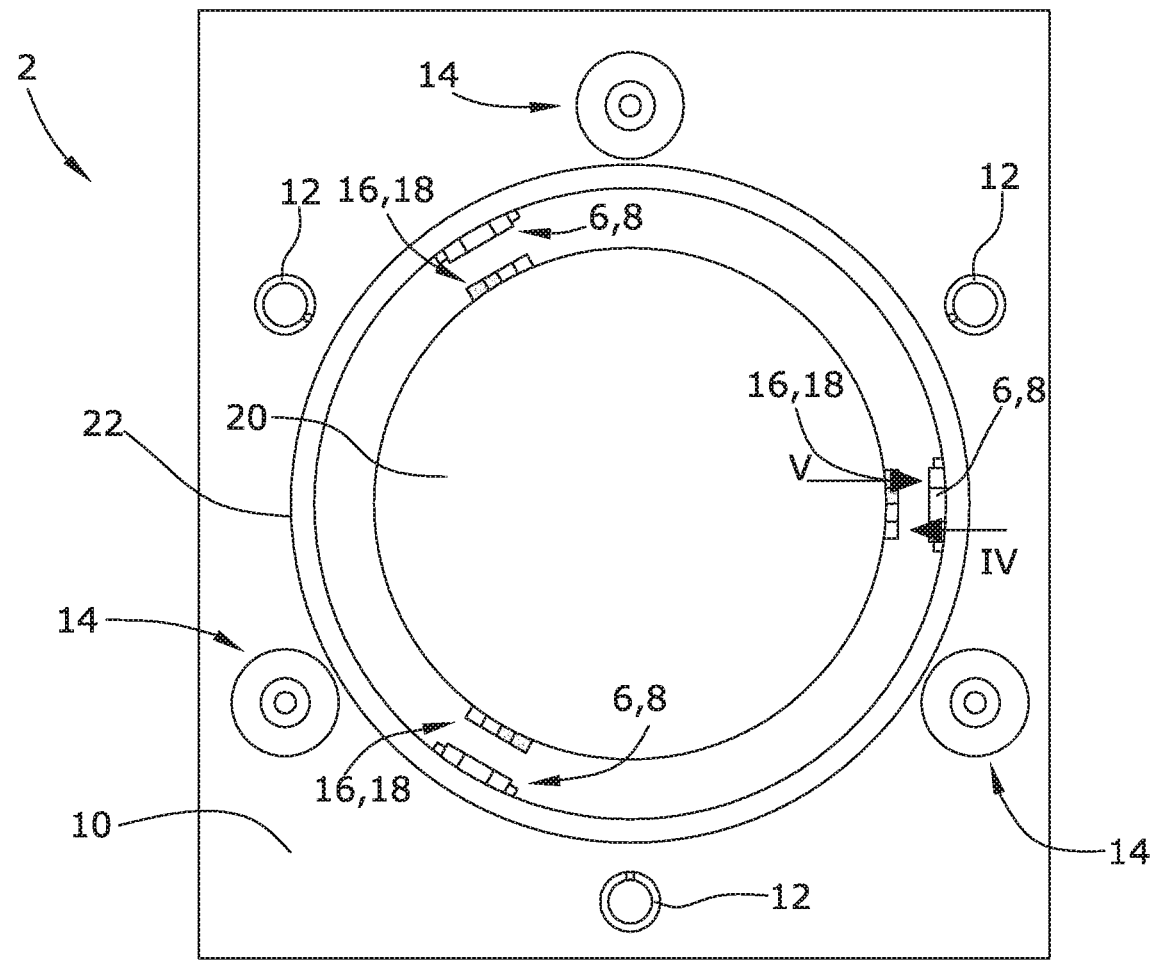
FIG. 2 shows a schematic top view of the input device according to the invention in another embodiment having the magnetic arrangement according to the invention for detecting relative movements and/or a relative position.

FIG. 2 shows another embodiment of the magnetic arrangement 2 having a different arrangement of the magnets 16, 18 and the magnetoresistive sensors 6, 8. Identical or similar elements are denoted by the same reference numerals. Instead of the alternating arrangement of the perpendicularly arranged magnets 18 and the horizontal magnets 16 along the circumference of the cylinder 20, as illustrated in FIG. 1, FIG. 2 shows an arrangement of the magnets 16, 18 as lying on top of each other in pairs. Here, a horizontal magnet 16 is respectively arranged on top of a perpendicularly arranged magnet 18, as illustrated in FIG. 4. These magnet pairs are arranged on a circle circumference, which lies on the lateral surface of the cylinder 20, each at an angular distance of 120° to each other. The cylinder 20 is arranged inside a hollow cylinder 22 which here exemplarily represents the first object 22 and on whose inside the sensors 6, 8 are located. The sensors 6, 8 are arranged in pairs such that a horizontal sensor 6 lies on top of a perpendicularly arranged sensor 8, as illustrated in FIG. 5, and this sensor pair is arranged oppositely to a magnet pair. Here, the sensor pairs are also arranged on a circle circumference on the inside of the hollow cylinder at the same angular distance of 120° to each other. Here, the detection of the relative movement and relative position is carried out in the same manner as the detection explained above with reference to FIG. 1.

The different embodiments of FIG. 1 and FIG. 2 exemplarily show that nearly any arrangement of the sensor units 4 can be selected. Thus it is not absolutely necessary that the sensors 6, 8 and respectively the magnets 16, 18 are each located in the same plane or on the same circle circumference. For example, the sensors 6, 8 or the magnets 16, 18 can be arranged at different levels or at different angular distances. Furthermore, it is possible to attach the sensors 6, 8 to the inner cylinder and to fasten the magnets 16, 18 to the outer hollow cylinder. It is also possible that the inner cylinder comprises both magnets and sensors. The outer hollow cylinder can also comprise magnets and sensors. Furthermore, it is possible to integrate any number of magnets and sensors in the magnetic arrangement 2.

Generally, it is preferred to arrange the magnets 16, 18 and/or the sensors 6, 8 at as large a distance as possible to each other to avoid interferences among them.

Here, as exemplarily illustrated in FIG. 3, the object 20 is connected to the second object 22. This connection is realized completely or at least partially via damper and/or stopping devices 14 and/or via spring elements 12. Thus the first object 22 and the second object 20 are flexibly connected to each other. Here, the first object is a hollow cylinder 22, for example. Here, the second object is illustrated as a cylinder 20, for example. As described above, the magnets 16, 18 and sensors 6, 8 are arranged on the cylinder 20 and the hollow cylinder 22.

In these embodiments, the first object 22 only comprises sensors 6, 8 and the second object 20 only includes magnets 16, 18.

In the embodiments illustrated here, it is possible that the first object 22 comprises a circuit board which is connected to an evaluation device and/or a control unit and/or an electrical power source which are not illustrated. Preferably, this is a single circuit board to which all sensors 6, 8 are connected.

In the embodiments illustrated in FIGS. 1 and 2, the first object 22 is fixedly connected to the plate 10. As illustrated, on this plate three damping and/or stopping 14 as well as three spring elements 12 are arranged. It is also possible that exclusively damping elements 14 or exclusively spring elements 12 or more or fewer spring elements 12 or damping elements 14 are used. In the illustrated embodiments, the spring elements 12 and the damping elements 14 each have an angular distance of 120° to each other. This, too, is not absolutely necessary, and a different arrangement may be selected. As illustrated in FIG. 3, for example, the second object 20 is connected to the spring elements 12 and the damping elements 14. Thus the second object 20 is arranged such that it is movable and in particular movable relative to the first object 22. In the illustrated embodiments, a movement of the second object 20 along all six degrees of freedom relative to the first object 22 is possible. On the other hand, it is conceivable that with the aid of the damping elements 14 and/or the spring elements 12 and/or bearing elements not illustrated a movement restriction is realized and the second object 22 can move along five or fewer degrees of freedom. Besides the illustrated embodiments, it is also conceivable that instead of the second object 20, the first object 22 is movable relative to the second object 20 and thus the second object 20 is stationarily arranged.

In the embodiment illustrated in FIG. 3, the movable connection of the two objects 20, 22 to a cap 24 is realized. Here, the second object 20 is arranged on the lower side of the cap 24 which, also on the lower side, is connected to the plate 10 via the spring elements 12 and damping elements 14. Thus the cap 24 and hence the second object 20 are movably connected to the plate 10 and thus also to the first object 22.

Further, in FIG. 3 an input device is illustrated which comprises the magnetic arrangement 2 according to the invention. For example, the input device is a 3D mouse for operating a design software. Here, the cap 24 represents the contact area or the input object accessible to the user. A user can grasp the cap 24 with his hand and deflect it along the six degrees of freedom or move it. With the aid of the magnetic arrangement 2 according to the invention, these deflections and movements are sensed, processed and passed on to a computer or robot, for example.

Figure 6C:
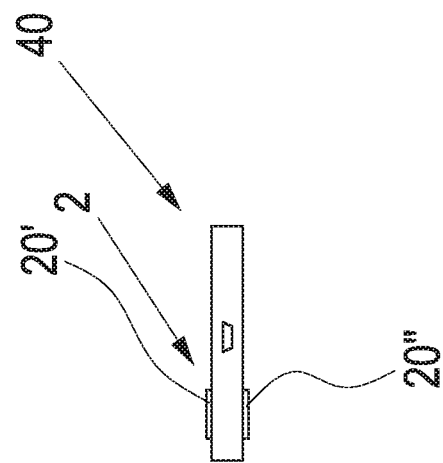
FIGS. 6a, 6b, 6c show schematic front, rear and side views of a mobile input device according to the invention.
Figure 6B:
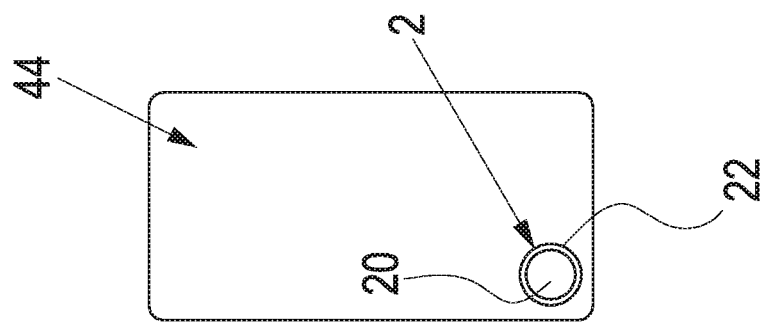
Figure 6A:
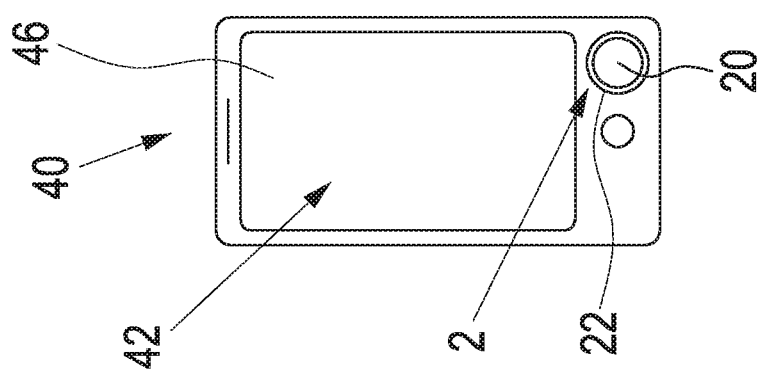

FIGS. 6a, 6b and 6c show a mobile input device according to the invention. In the illustrated embodiment, the mobile input device is a mobile phone 40, wherein in FIG. 6a the front side, in FIG. 6b the rear side, and in FIG. 6c a side view are illustrated.

The mobile phone 40 of FIG. 6a comprises an upper side 42 having a display 46. In the mobile phone 40 a magnetic arrangement 2 according to the invention is embedded. Here, the first object 22 of the magnetic arrangement is integrally connected to the mobile phone 40. In the illustrated embodiment, this connection is realized in such a manner that the first object is a hollow cylinder which is embedded in the mobile phone 40 such that the cylinder extends from the upper side 42 to the lower side 44 of the mobile phone 40. Inside the hollow cylindrical first object 22 the second object 20 configured as a solid cylinder is arranged. As can be seen in FIG. 6c, two sides 20', 20" of the object 20 project beyond the external dimensions of the mobile phone 40. Thus the second object 20 can be grasped by the user with his index finger and thumb, for example, from above and below on both sides 20', 20" and hence moved relative to the first object 22. In the embodiments, it is preferred that the magnetoresistive sensors 6, 8 are connected to the first object 22, in particular on the inner surface of the hollow cylindrical first object 22. The magnets 16, 18, on the other hand, are connected to the second object 20, in particular arranged on the lateral surface of the cylindrical second object 20.

In the illustrated embodiment, the second object 20 projects beyond the external dimensions of the mobile phone 40. However, this is not absolutely necessary. It is also possible that the second object 20 is flush with the mobile phone 40. Also, it is possible that the second object 20 comprises depressions or recesses on the sides 20', 20", for example, and thus projects into the external dimensions of the mobile phone 40.

The invention claimed is:

1. A magnetic arrangement for detecting a relative movement and/or relative position of a first object and a second object relative to each other in six components, notably three displacements and three angular rotations in and respectively about three axes of a Cartesian coordinate system, comprising: at least six sensor units for detecting the three displacements and the three angular rotations, wherein each sensor unit comprises at least one magnet and a magnetoresistive sensor, wherein the at least one magnet of at least one sensor unit of the at least six sensor units is movable relative to the magnetoresistive sensor of the at least one sensor unit, wherein each sensor unit has a sensor direction, wherein the magnetoresistive sensor measures a position of the at least one magnet along the sensor direction, wherein the magnetoresistive sensors are one-dimensional sensors, wherein a first group of sensor units and a second group of sensor units each comprise at least three sensor units of the at least six sensor units, and wherein the sensor directions of the sensor units of the first group of sensor units extend essentially perpendicularly to the sensor directions of the sensor units of the second group and are associated with respective correspondingly oriented, opposite magnets, wherein each magnet of the correspondingly oriented, opposite magnets is configured such that a connecting line between a north and a south pole of a first magnet of the correspondingly oriented, opposite magnets extends perpendicularly to the connecting line between a north and a south pole of a second magnet of the correspondingly oriented, opposite magnets.

2. The magnetic arrangement according to claim 1, wherein the sensor units of at least one of the first group of sensor units and the second group of sensor units are arranged on a first circle circumference and a second circle circumference, respectively, at the same angular distance of 120°.

3. The magnetic arrangement according to claim 2, wherein two planes where the first circle and the second circle circumference lie, respectively, are parallel.

4. The magnetic arrangement according to claim 1, wherein the magnetoresistive sensors are AMR sensors, GMR sensor, CMR sensors or TMR sensors.

5. The magnetic arrangement according to claim 1, wherein the at least one magnet is a permanent magnet.

6. The magnetic arrangement according to claim 1, wherein the magnets are arranged on the second object, and the magnetoresistive sensors are arranged on the first object, wherein the second object is movable and wherein the first object is immovable.

7. The magnetic arrangement according to claim 1, wherein the magnetoresistive sensors are arranged on a common circuit board that is connected to at least one of an evaluation device, a control device, and an electrical power source.

8. The magnetic arrangement according to claim 1, wherein the magnets are rigidly connected to each other and are arranged as a common arrangement on the second object, and wherein the second object is movable.

9. The magnetic arrangement according to claim 1, further comprising a mechanical stop,
wherein the mechanical stop prevents the respective magnet from leaving the respective measuring range of the magnetoresistive sensor associated with the mechanical stop, and
wherein the mechanical stop includes a damping device and/or a stopping device.

10. The magnetic arrangement according to claim 1, wherein the first object and the second object are flexibly connected to each other via at least one spring element, and are movable relative to each other.

11. The magnetic arrangement according to claim 1, wherein the first object and/or the second object are circular cylindrical.

12. The magnetic arrangement according to claim 1, wherein the first object essentially hollow cylindrical, and/or the second object is essentially configured as a solid cylinder.

13. The magnetic arrangement according to claim 1, wherein the magnets are arranged on an outside of the second object, and/or the magnetoresistive sensors are arranged on an inside of the first object.

14. The magnetic arrangement according to claim 1, wherein the second object is arranged inside the first object.

15. The magnetic arrangement according to claim 1, wherein the second object comprises two sides essentially longitudinally opposite each other, wherein the magnetic arrangement is configured such that a user can move at least one of the two sides.

16. An input device, comprising a magnetic arrangement according to claim 1, wherein the second object has a cylindrical or spherical shape for serving as a resting surface for a hand or at least a finger of a user, and wherein the second object is movable.

17. A mobile input device comprising at least one of a mobile phone, a tablet computer, a laptop, or a navigation device and at least one magnetic arrangement according to claim 1, wherein the mobile input device is connected to the first object of the magnetic arrangement to rotate therewith.

18. The mobile input device according to claim 17, wherein a processor of the mobile input device corresponds to an evaluation device and/or a control unit of the magnetic arrangement.

19. The mobile input device according to claim 17, wherein a power source of the mobile device is a rechargeable battery that corresponds to a power source of the magnetic arrangement.

20. The mobile input device according to claim 17, wherein the magnetic arrangement is arranged inside the mobile device.

21. The mobile device according to claim 17, wherein the second object of the magnetic arrangement is adapted to be moved by a user from a lower side and/or an upper side of the mobile device.

22. The magnetic arrangement according to claim 1, wherein the magnets are arranged on the second object or the magnetoresistive sensors are arranged on the first object, wherein the second object is movable and wherein the first object is immovable.

* * * * *